United States Patent Office 2,822,331
Patented Feb. 4, 1958

2,822,331

ANHYDROUS CALCIUM 12-HYDROXY STEARATE GREASE

John P. Dilworth, Fishkill, N. Y., Oney P. Puryear, Houston, Tex., and Harry V. Ashburn, deceased, late of Beacon, N. Y., by Evelyn L. Ashburn, administratrix, Beacon, N. Y., assignors to The Texas Company, New York, N. Y., a corporation of Delaware No Drawing. Application February 3, 1954
Serial No. 408,028

22 Claims. (Cl. 252—40)

This invention relates to an anhydrous alkaline earth metal lubricating grease prepared from a hydroxy fatty acid. More particularly, it is concerned with the preparation of a calcium 12-hydroxy stearate grease.

This application is a continuation-in-part of a copending application, Serial No. 247,558, filed September 20, 1951, now abandoned, wherein it was disclosed that control of the dehydration temperature below about 275° F. is critical to the formation of lump-free stable anhydrous calcium 12-hydroxy stearate greases and that a cold premixing step in conjunction with controlled dehydration temperature is essential to the production of lump-free, grain-free stable anhydrous calcium 12-hydroxy stearate greases of smooth buttery texture. This continuation-in-part application involves the additional discovery that lump-free, grain-free calcium 12-hydroxy stearate greases cannot be prepared from substantially pure 12-hydroxy stearic acid, but require that the hydroxy acid contain a minimum amount of estolide polyesters of 12-hydroxy stearic acid.

The use of 12-hydroxy stearic acid as the fatty material in the preparation of lubricating grease has achieved substantial commercial importance in connection with the more expensive lithium base greases for certain specialty applications. However, the use of this hydroxy fatty acid in the manufacture of a calcium base grease has heretofore not proved commercially satisfactory. U. S. Patent No. 2,380,960 has proposed the manufacture of a water-stabilized calcium 12-hydroxy stearate grease; but such a grease does not have sufficient advantages over the customary water-stabilizing cup greases to justify the use of the more expensive 12-hydroxy stearic acid. Attempts to make a substantially anhydrous calcium 12-hydroxy stearate grease by conventional grease-making procedures have proved unsatisfactory due to the fact that the resulting product is so grainy and has such poor stability as to be unsalable.

One of the principal objects of the present invention is to provide a method of manufacturing in good yield a stable anhydrous calcium 12-hydroxy stearate grease which is of a smooth buttery texture substantially free from graininess.

Another object of the present invention is to provide an anhydrous calcium 12-hydroxy stearate grease of this character which has substantially improved properties including higher dropping point, greatly improved resistance to change in penetration under high shearing stress, better low temperature and high temperature properties, and improved resistance to change in penetration with time on storage and use, than anhydrous calcium base greases heretofore produced.

The lump-free, grain-free calcium 12-hydroxy stearate greases of this invention comprise 80 to 95 weight percent oleaginous liquid lubricating base and 5 to 20 weight percent calcium 12-hydroxy stearate which has been prepared from 12-hydroxy stearic acid containing at least 3 weight percent of an estolide which is an intermolecular polyester of 12-hydroxy stearic acid having a molecular weight above 580 and usually in the range of 800 to 1,200. The presence o fthe estolide in the 12-hydroxy stearic acid is essential to the preparation of stable anhydrous calcium 12-hydroxy stearate greases characterized by a smooth buttery texture and freedom from lumps and grains.

It is impossible to prepare stable anhydrous calcium 12-hydroxy stearate greases which are lump-free and grain-free from substantially pure 12-hydroxy stearic acid, even employing special techniques such as the cold premix-controlled digestion temperature technique of the aforeidentified parent application or the selected naphthene base oil-dehydration above the melting point technique of the copending application, Serial No. 388,426, filed October 26, 1953, now abandoned, in the names of J. P. Dilworth, C. H. Culnane and R. F. Nelson. An estolide concentration between 3 and 15 weight percent of the 12-hydroxy stearic acid and advantageously between 4 and 10 percent is essential to the successful preparation of lump-free, grain-free stable anhydrous calcium 12-hydroxy stearate greases of smooth buttery texture regardless of the technique employed.

The estolide whose presence in the amount of at least 3 weight percent of the 12-hydroxy stearic acid has been discovered to be essential to the preparation of lump-free, grain-free stable anhydrous calcium 12-hydroxy stearate greases of smooth buttery texture is an intermolecular polyester of 12-hydroxy stearic acid having the following general formula:

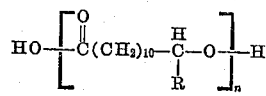

wherein R is an alkyl group of 6 carbon atoms and $n$ is an integer of 2 to 5. Since the average molecular weight of the estolide is in the neighborhood of 800 to 1,200, it is postulated that the estolide whose presence is essential to successful calcium base grease preparation from 12-hydroxy stearic acid comprises mainly dimers, trimers, tetramers and pentamers.

As indicated previously, the minimum percentage of estolide required for preparation of lump-free, grain-free calcium 12-hydroxy stearate greases is 3 weight percent. The maximum percentage is set at 15 weight percent because higher percentages, while giving smooth lump-free, grain-free products, substantially reduce the yield and require so much soap for a desired consistency as to make the preparation uneconomical. The preferred amount of estolide is in the range of 4 to 10 weight percent of the total 12-hydroxy stearic acid.

This invention also includes the novel manufacturing procedure involving a combination of certain unconventional steps which was disclosed in the previously identified parent application as required to produce a lump-free, grain-free stable anhydrous calcium 12-hydroxy stearate grease. These steps involve an initial mixing of the essential ingredients including 12-hydroxy stearic acid containing 3 to 15 weight percent estolide in the cold or unheated condition such as by adding them to an unheated grease kettle at room temperature below 100° F. followed by mixing for a period of time in excess of 10 minutes before the heating of the kettle is initiated. The essential ingredients initially added to the kettle at this time include a minor portion of the liquid oleaginous lubricating base such as a mineral lubricating oil, a small amount of water, hydrated lime and 12-hydroxy stearic acid containing between 3 and 15 weight percent estolide. Stirring of this mixture in the cold produces a thick emulsion of the ingredients before any substantial saponification takes place. After this cold premixing, the temperature is raised to and maintained at about 150 to 210° F. with stirring for a period of time to effect saponification. This cold premix step is necessary to the production of grain-free product. The second step, which is particularly critical in the elimination of the problem of lumpiness, is the temperature of the dehydration step which follows the saponification. The dehydration is carried out with stirring at a temperature below about 285° F., and preferably not over 275° F.; temperatures between 250 and 275° F. are ordinarily used for the dehydration. Careful control of the temperature of dehydration in this manner prevents any substantial melting of the soap base along the side and bottom of the kettle. The dehydrated mass having a water content below 0.1 percent on the basis of the final grease composition is then brought to the desired consistency by addition of the major quantity of liquid oleaginous lubricating base as the mass slowly cools with continued stirring. Following dehydration and during the addition of the major portion of the liquid oleaginous lubricating base, it is important that the mass should not be reheated, as otherwise a change in texture with resulting graininess is likely to occur.

In the preferred procedure in accordance with the present invention, an open type grease kettle equipped with stirrers and a steam heating jacket may be employed. To the cold kettle, the essential ingredients are added in the following order. The distillate paraffin base mineral lubricating oil having an SUS viscosity at 100° F. below 350 and generally about 150 to 330 is charged in an amount by weight roughly equivalent to the total weight of 12-hydroxy stearic acid containing the prescribed amount of estolide. A small amount of water sufficient to facilitate the saponification reaction, but which is less than the weight of the above-mentioned distillate lubricating oil, is then added. The total amount of estolide-containing 12-hydroxy stearic acid in unmelted form is then introduced followed by an amount of hydrated lime in slight excess of the equivalent stoichiometric amount with respect to the amount of 12-hydroxy stearic acid so as to provide about 0.1 to 0.8 percent and preferably about 0.2 percent by weight of free calcium hydroxide based on the finished grease. The lime is preferably added in the dry powdered form.

The added ingredients are then stirred without heating for a period of about 15 minutes or more to form a thick emulsified mixture. Then the steam is turned into the jacket and the temperature of the mixture is slowly raised with stirring to about 150 to 210° F., and preferably about 180 to 200° F., and maintained at that temperature with stirring for a period of time in excess of 2 hours, and preferably about 4 hours, to effect saponification. The temperature of the saponified mass is then gradually raised by controlled steam pressure in the jacket with stirring to about 250 to 275° F. and maintained at that temperature with stirring for a period of time in excess of 2 hours, and generally 4 hours, to effect dehydration, while avoiding local overheating and any substantial melting of the soap base along the side and bottom of the kettle. The water in the grease is thereby removed so that the finished grease tests less than 0.1 percent water, which is herein termed an "anhydrous" grease, and generally only a trace of water. The steam to the kettle jacket is then cut off and the major portion of the mineral lubricating oil or other liquid oleaginous lubricating base is gradually added to the dehydrated mass with continued stirring, as the mass slowly cools to below 210° F. The amount of mineral lubricating oil, or other liquid oleaginous liquid lubricating base or mixture thereof, employed is such as to bring the soap content within the range of 5 to 20 percent and preferably about 6 to 15 percent by weight based on the finished grease. Any additives employed in the grease, such as an oxidation inhibitor, are added at this time, and the mass is finally drawn from the kettle at about 160 to 180° F. through a straining screen into containers to obtain a smooth buttery grease substantially free from graininess having an ASTM unworked penetration below 400 and above 150 and a dropping point above 275° F.

Good yields of the foregoing grease are obtained by this procedure from estolide-containing 12-hydroxy stearic acid. Smooth buttery grain-free products in the NLGI grades No. 0 to No. 2 are regularly obtained with soap contents of about 7 to 12 percent by weight respectively based on the finished grease. Advantageous properties from the standpoint of color and appearance of the product are obtained by the addition of about 0.5 to 3.0 percent by weight of a heavy residual mineral lubricating oil, such as a residiuum having an SUS viscosity at 210° F. in excess of 400 and preferably about 600 to 800. Moreover, where it is desired to provide a heavier base oil blend in the final product, such as one meeting U. S. Army Specification 2–108B requirements of a base oil blend having an SUS viscosity at 210° F. of 75 to 100, excellent greases of this character can be prepared by blending in, following the dehydration step, a sufficient proportion of a refined cylinder stock having an SUS viscosity at 210° F. in excess of 125, such as a deasphalted and solvent refined cylinder stock having an SUS viscosity at 210° F. of about 140 to 180.

In the preparation of a grease of this character having a heavier base oil blend, it is desirable to initially charge a distillate mineral lubricating oil having an SUS viscosity at 100° F. below 350 seconds and preferably about 150 to 200 seconds, and then blend in, following dehydration, a heavier mineral lubricating oil which may be either a distillate oil or a cylinder stock. In addition, the mass should preferably not be reheated following dehydration, but the oil addition to obtain desired consistency should be carried out slowly as the mass gradually cools with stirring. In this manner, substantially grain-free greases of excellent texture and properties are uniformly obtained.

The following examples illustrate the critical nature of the prescribed cold premix and temperature of digestion in the production of stable anhydrous lump-free and grain-free calcium 12-hydroxy stearate greases from estolide-containing 12-hydroxy stearic acid. Example I demonstrates the critical nature of the specified temperature of digestion in producing a lump-free product; it will be noted that the control of the dehydration temperature without using the cold premix produced a lump-free product which was objectionable because of its graininess. Example II demonstrates that a lump-free, grain-free stable anhydrous calcium 12-hydroxy stearate grease is produced using estolide-containing 12-hydroxy stearic acid and employing the cold premix step in conjunction with dehydration of the saponified mixture at prescribed temperature conditions.

EXAMPLE I

An open grease kettle was charged with 15 lbs. of a distillate paraffin base mineral lubricating oil of SAE 10 grade and 3.5 lbs. of water. 15 lbs. of 12-hydroxy stearic acid containing approximately 5.0 percent estolide having an average molecular weight of about 1,000 was added, and with the kettle contents heated to 186° F., 1.92 lbs. of hydrated lime in the form of a water slurry was then slowly run in. The kettle contents were maintained at 186 to 190° F. for six hours to complete saponification. They were then raised in 2.2 hours with stirring to 300° F. and maintained at 300 to 307° F. for 1 hour to complete dehydration. Further addition of the said distillate mineral lubricating oil, together with a proportion of a refined cylinder stock having an SUS viscosity at 210° F. of 203, was then slowly made as the mass cooled down wtih stirring to bring the soap content to about 14.3 percent by weight, with the ratio of the distillate oil to the cylinder stock being in the proportion of 60 percent distillate oil to 25.7 percent cylinder stock. The grease was drawn at 160° F. The resulting product was unsatisfactory, being exceedingly grainy and containing numerous seed lumps.

A second batch of grease was made in a similar manner, except that in this case the dehydration temperature was maintained at 268 to 272° F. The initial charge contained 10 lbs. of the distillate mineral lubricating oil, 10 lbs. of water, 14.1 lbs. of 12-hydroxy stearic acid containing approximately 5.0 percent of estolide and 1.90 lbs. of hydrated lime in water slurry which were added while stirring the mass at 198° F. Saponification was carried out for 4 hours at 184 to 194° F.; then the mass was heated in 4.5 hours to 269° F. and maintained at 268 to 272° F. for 3 hours to complete dehydration. A blend of the distillate mineral lubricating oil with the said cylinder stock was then introduced slowly over a period of 25 hours, an oxidation inhibitor added, and the grease finally drawn at 142° F. The calculated composition of this grease was 11.8 percent soap, 61.6 percent of the distillate oil, 26.2 percent of the cylinder stock and 0.4 percent of the oxidation inhibitor. The resulting product was lump-free and a substantial improvement over the previous product, but was still objectionable due to graininess. This shows that control of the dehydration temperature eliminates lumps from the product, but is not sufficient in conjunction with the other usual grease-making steps to overcome the objection due to graininess.

EXAMPLE II

In one batch, 20 lbs. of a distillate mineral lubricating oil of SAE 20 grade, together with 10 lbs. of water and 14.1 lbs. of 12-hydroxy stearic acid containing approximately 5.0 percent estolide having an average molecular weight of about 1,000 were charged to an unheated grease kettle. 2.18 lbs. of dry hydrated lime were then added and the mixture stirred for 5 minutes at 90° F. before the steam was turned on to the kettle jacket. The resulting mix was then heated for 4¼ hours at 146 to 197° F. to effect saponification, then raised in 2 hours to 272° F. and maintained at 269 to 276° F. for 3 hours to effect dehydration. Addition of the said distillate oil was then made over a period of 10 hours as the stirred mass cooled to 218° F. The grease was finally drawn to obtain a calculated composition of 15.3 percent soap with 0.2 percent excess calcium hydroxide and 84.5 percent mineral lubricating oil. The resulting product was lump-free, but unsatisfactory due to graininess.

A second batch was made in essentially similar manner, except that in this case the initial ingredients were stirred for 15 minutes at 70° F. before the steam was turned on to the kettle jacket. A satisfactory smooth, buttery grease with very slight grain was thereby obtained.

A third batch was prepared in similar manner, except that in this case the initially charged ingredients were stirred for 10 minutes at 76° F. before the steam was turned on. This product was deemed satisfactory, although borderline with respect to graininess.

In batches 2 and 3 immediately above, the initial charge contained the same amounts of ingredients as in batch 1, except that 14 lbs. of the distillate mineral lubricating oil was charged instead of the 20 lbs. in the first batch.

The foregoing illustrates the importance not only of adding the hydrated lime to the other ingredients in the cold, but also of stirring these ingredients for a minimum period of at least 10 minutes, and preferably about 15 minutes, to thoroughly emulsify the mass before heating of the kettle is started.

The following examples show the necessity of employing a 12-hydroxy stearic acid having an estolide content in the range of 3 to 15 weight percent in order to produce a stable anhydrous calcium 12-hydroxy stearate grease which is lump-free and grain-free even using the special critical conditions of cold premix and dehydration below 275° F. Example III shows a lump-free, grain-free product is not obtained using highly purified 12-hydroxy stearic acid which contains substantially no estolides. Example IV shows the effect of adding approximately 3 weight percent estolide to the purified 12-hydroxy stearic acid of Example III; it will be noticed that the product is improved, but still is slightly grainy. Example V demonstrates the effect of adding approximately 6 weight percent estolide to the highly purified 12-hydroxy stearic acid used in Example III; the resulting calcium base grease is a satisfactory smooth buttery product completely free from lumps and grains. Example VI shows that poor yields are obtained when the estolide content of the 12-hydroxy stearic acid is above the prescribed 3 to 15 weight percent range.

EXAMPLE III 3.5 lbs. of a distillate mineral oil of SAE 20 grade, 2.5 lbs. of water and 3.5 lbs. of estolide-free 12-hydroxy stearic acid, as indicated by its hexane insolubility at 32° F., a Neut. No. of 180, Sap. No. of 186 and Hydroxyl No. of 161, were charged to an unheated grease kettle. 235 g. of dry hydrated lime was then added, and the mixture stirred for 15 minutes at a temperature of about 66° F. before the steam was introduced into the kettle jacket. The resulting mass was then heated for about 4.5 hours at 180 to 189° F. to effect saponification; the mixture was then raised in 2 hours and 20 minutes to a temperature of about 269° F. and maintained at a temperature between 264 and 271° F. for about 3 hours to effect dehydration. The dehydrated mass was then brought to a NLGI No. 2 consistency by the slow addition of 19.3 lbs. of distillate oil over a period of about 10.5 hours, while the temperature slowly dropped to 125° F. During the addition of the distillate oil, about 1 percent by weight based on the finished grease of a dark colored residual oil having an SUS viscosity at 210° F. of about 760 was added together with 0.5 percent by weight of diphenylamine, an oxidation inhibitor. On drawing of the grease through three 60 mesh screens, which plugged twice during the straining operation, there was obtained a dark green glossy smooth grease which, although lump-free, was objectionable because it was full of small grains.

EXAMPLE IV 12-hydroxy stearic acid containing approximately 5 percent estolide was subjected to extraction with 10 parts of a hexane fraction and the solution chilled to 32° F. The solids precipitated by this treatment were separated from the hexane solution by filtration and the filter cake washed with hexane at 32° F. The hexane extract was combined with the hexane wash solution, and the composite subjected to vacuum evaporation at room temperature to remove the hexane solvent. The recovered extract material which amounted to about 9 percent of the original 12-hydroxy stearic acid was a waxy straw colored solid at room temperature, and had a Neut. No. of 122, a Hydroxyl No. of 52 and a Sap. No. of 184. Further analysis of this material indicated that it contained about 60 percent estolide having an average molecular weight of about 1,000 and 40 percent stearic acid with a minor amount of 12-hydroxy stearic acid being present.

79 g. of this predominantly estolide fraction was incorporated in 1,510 g. of the pure 12-hydroxy stearic acid used in the previous example to give a 12-hydroxy stearic acid mixture containing approximately 3 percent estolide. The cold kettle was charged with 3.5 lbs. of the distillate paraffin base mineral lubricating oil used in Example III, 2.5 lbs. of water, 1,589 g. of 12-hydroxy stearic acid-estolide mixture and 235 g. of dry hydrated lime in that order. The mass was stirred for 15 minutes at a temperature of 77° F. to form a thick emulsified mixture before the steam was turned on to the kettle. The mixture was then saponified at a temperature of 165 to 188° F. over a period of 4.5 hours. The saponified mixture was then slowly raised to 262° F. and maintained for 3.5 hours at a temperature between 262 and 275° F. with controlled heating and stirring to avoid any substantial melting of the soap base and effect dehydration. The dehydrated mass was then brought to an NLGI No. 2 consistency by the slow addition of 19.3 lbs. of distillate oil over a period of 10 hours while the temperature slowly dropped to 194° F. During the addition of the distillate oil, about 1 percent by weight based on the finished grease of a dark colored residual lubricating oil having an SUS viscosity at 210° F. of about 760 was added together with 0.5 percent by weight of diphenylamine as an oxidation inhibitor. The grease was then drawn through three 60 mesh screens without screen plugging, but with considerable build-up of soap on the screens. The resulting grease was a lump-free smooth glossy product which was borderline with respect to graininess.

EXAMPLE V 159 g. of the estolide extract obtained as described in the previous example was added to 1,430 g. of the pure 12-hydroxy stearic acid used in Example III to give a mixture containing approximately 6 weight percent estolide. A cold kettle was charged with 3.5 lbs. of the distillate paraffin base mineral oil of the type used in Example III, 2.5 lbs. of water, 1,589 g. of the foregoing 12-hydroxy stearic acid-estolide mixture and 235 g. of dry hydrated lime in that order. The mass was stirred for 15 minutes at a temperature of 72° F. to form a thick emulsified mixture before the steam was introduced into the kettle jacket. The reaction mixture was then saponified at a temperature of 182 to 189° F. over a period of 4.5 hours. The saponified mixture was then slowly raised to a temperature of 267° F. and maintained for a period of about 3 hours at 263 to 271° F. with controlled heating and stirring to avoid any substantial melting of the soap base and effect dehydration. The dehydrated mass was then brought to an NLGI No. 2 consistency by the slow addition of 19.3 lbs. of distillate oil over a period of about 9 hours while the temperature slowly dropped to 176° F. During the addition of the distillate oil, about 1 percent by weight based on the finished grease of a dark colored residual lubricating oil having an SUS viscosity at 210° F. of about 760 and about 0.5 weight percent of diphenylamine, an oxidation inhibitor, were added. The grease was then drawn through three 60 mesh straining screens without any screen plugging or accumulation of soap. The drawn grease was a dark green glossy smooth buttery product which was lump-free and grain-free and possessed a medium feather. This product, made from 12-hydroxy stearic acid containing 6.0 weight percent estolide and manufactured by the cold premix-controlled temperature digestion procedure, meets all the qualifications of a commercial grease from the standpoint of stability and freedom from lumps and grains.

EXAMPLE VI

The cold kettle was charged with 3.5 lbs. of a distillate paraffin base mineral oil of the type described in Example III, 2.5 lbs. of water, 3.5 lbs. of 12-hydroxy stearic acid containing about 25 weight percent estolide, as determined by hexane extraction and its Neut. No. of 154, Sap. No. of 186 and Hydroxyl No. of 129, and 235 g. of dry hydrated lime in that order. The mass was stirred for 15 minutes at room temperature (approximately 72° F.) to form a thick emulsified mixture before the steam was introduced into the kettle jacket. The reaction mixture was then saponified at a temperature of 186 to 197° F. over a period of 4 hours. The saponified mixture was then slowly raised to a temperature of 263° F. and maintained at a temperature between 260 and 272° F. for about 3 hours and 40 minutes with controlled heating and stirring to avoid any substantial melting of the soap base and effect dehydration. 19.3 lbs. of distillate oil (the amount which brought previous product to NLGI No. 2 consistency) was then added to the dehydrated mixture over a period of about 9 hours while the temperature slowly dropped to 185° F. During the addition of the distillate oil, approximately 1 percent by weight based on the finished grease of a dark colored residual lubricating oil fraction having an SUS viscosity at 210 F. of about 760 and about 0.5 weight percent of diphenylamine, an oxidation inhibitor, where added. The product was pumped through three 60 mesh screens and was a dark green glossy semi-fluid grease having an unworked penetration at 77° F. of 428, and when worked was a liquid. This product, which is characterized as a liquid, indicates that an excess of estolide in the 12-hydroxy stearic acid over the prescribed 3 to 15 weight percent range results in the production of a very fluid product indicative of a very poor yield.

Based on the foregoing results, a standard procedure was formulated which insured the product of uniformly satisfactory results. The procedure has the following three critical requirements:

(1) The use of 12-hydroxy stearic acid containing 3 to 15 weight percent estolide.

(2) A cold premix step.

(3) Dehydration of the saponified mixture at a temperature below about 285° F. and preferably below 275° F.

In Example VII, which follows, there is shown the preparation of an anhydrous calcium 12-hydroxy stearate ball and roller bearing grease which has certain outstanding properties.

EXAMPLE VII

The cold kettle was charged with 14.0 lbs. of a distillate paraffin base mineral lubricating oil of SAE 20 grade having an SUS viscosity at 100° F. of 335 seconds, 10 lbs. of water, 14.1 lbs. of 12-hydroxy stearic acid containing about 5.0 weight percent estolide having an average molecular weight of about 1,000, and 2.19 lbs. of dry hydrated lime in that order. The mass was stirred for 15 minutes at a temperature of 87° F. to form a thick emulsified mixture before the steam was turned on to the kettle. The kettle contents were then saponified at 172 to 209° F. over a period of 4.5 hours. The saponified mix was then raised in 2.5 hours to 267° F. and maintained for 3 hours at 267 to 274° F. with controlled heating and stirring to avoid any substantial melting of the soap base and effect dehydration. The dehydrated mass was then brought to an NLGI No. 2 consistency by the slow addition of further quantities of the distillate oil over a period of 19 hours while the temperature slowly dropped to 182° F. About 1 percent by weight based on the finished grease of a dark colored residual lubricating oil having an SUS viscosity at 210° F. of about 760 was added, together with 0.5 percent by weight of diphenylamine as an oxidation inhibitor. The grease was then drawn through straining screens to obtain a green-brown glossy, smooth buttery grease of medium transparent feather and substantially free from graininess.

Typical compositions and tests obtained on the foregoing grease, as well as batches prepared to the NLGI grades 0 and 1, are set forth in the following Table I:

Table I

|  | Grade 0 | Grade 1 | Grade 2 |
|---|---|---|---|
| Calculated Composition: | | | |
| Ca 12-hydroxy stearate [1] | 7.1 | 10.7 | 11.8 |
| Excess Ca(OH)$_2$ | 0.2 | 0.2 | 0.2 |
| Distillate paraffin base mineral lubricating oil—SUS at 100° F. of 335 sec | 91.2 | 87.6 | 86.5 |
| Residual mineral lubricating oil—SUS at 210° F. of 760 sec | 1.0 | 1.0 | 1.0 |
| Diphenylamine | 0.5 | 0.5 | 0.5 |
| Tests: | | | |
| Water | Trace | Trace | Trace |
| Free Ca(OH)$_2$, percent | 0.20 | 0.23 | 0.30 |
| Dropping point, ° F | 286 | 287 | 293 |
| ASTM penetration at 77° F.— | | | |
| Unworked | 377 | 273 | 231 |
| Worked | 375 | 337 | 284 |
| AN-G-25 Working Stability—Penetration after 100,000 strokes | 352 | 323 | 270 |
| Norma Hoffman Oxidation—Pressure drop in 100 hrs.—lbs | 4 | 2 | 5 |
| Dynamic Water Resistance—Loss, percent | 5.4 | 2.8 | 2.4 |
| Low Temp. Torque—120 sec. per revolution at below | −60° F. | −50° F. | −60° F. |
| Static Oven Heat Test—1 hr. at 275° F | No melting or separation | | |
| Torque Breakdown Machine— 80—250° F | Tim. / Fed. | Tim. / Fed. | Tim. / Fed. |
| Leakage, percent | 0 / 13 | 0 / 0 | 0 / 0 |
| Overall rating | Good / Good | Good / Good | Good / Good |

[1] In all the tables, the soap content includes calcium soap of estolide + calcium soap of 12-hydroxy stearic acid.

The AN-G-25 working stability test of the foregoing table is a measure of the resistance of the grease to change in consistency on high shearing stress. This test is carried out in accordance with U. S. Federal method 31.3 contained in U. S. Federal Specification VV-L-791d. The tester is a mechanical grease working machine consisting of a cup or cylinder having a perforated plunger plate with 270 holes of 1/16" diameter, with the plunger plate being actuated through 60 double strokes per minute. The cup is filled with the grease under test, which is then worked for 100,000 double strokes (approximately 28 hours), following which the ASTM worked penetration of the grease at 77° F. is determined. From the foregoing table it will be noted that the penetration change on this severe test was only about 14-23 points, and this without liquefaction or other physical change in the character of the grease during the test as occurs with other types of calcium base greases. Numerous other tests have confirmed that this calcium base grease is outstanding in its resistance to change in consistency on high shearing stress.

The Norma Hoffman oxidation test of the foregoing table is a measure of the resistance to oxidation of the lubricating grease when stored under static conditions for long periods of time. Samples of the grease are tested in a stainless steel bomb sealed in an atmosphere of oxygen under initial pressure of 110 lbs. per sq. in. at 210° F., with the pressure drop at the end of 100 hours being recorded. The test is described in more detail in U. S. Patent No. 2,528,373, column 13, lines 44 to 58. The results listed in the foregoing table show that the grease has good resistance to oxidation.

The dynamic water resistance test measures the resistance of the grease against being washed out of a ball bearing in the presence of water. This test is carried out as described in U. S. 2,528,373 in column 13, lines 25 to 43. The results listed in the table show that this grease is outstanding in its water resistance properties.

The low temperature torque test is a measure of the resistance of the grease to congealing, and of its ability to afford proper lubrication under extremely low temperature conditions. This test is carried out as described in U. S. 2,528,373 from column 12, line 58, to column 13, line 24. The results of the table show the grease to possess god low temperature properties, with the grease resisting congelation so that more than 120 seconds is required for one revolution of the bearing under the conditions of the test only at temperatures below −50 to −60° F.

The static oven heat test is a measure of the stability of the grease at elevated temperatures. This test is run by placing a sample of the grease in an oven where it is maintained for one hour at 275° F. As shown in the table, the grease is entirely stable at this temperature, which is above the stability temperature for other types of calcium base greases. The combination of low and high temperature properties is unique for a calcium base grease.

The torque breakdown machine test is designed to evaluate the lubricating properties of grease used for the lubrication of anti-friction bearings. The test is carried out as described in U. S. 2,528,373 from column 6, line 46, to column 7, line 33, with two types of anti-friction bearings, namely, a Timken tapered roller bearing and a Federal ball bearing. As shown by the table, the rating of the grease by this test is uniformly good, with little to no leakage from the bearings being experienced during the test.

In addition to the foregoing tests, other laboratory and service tests have been made which further prove the outstanding properties of the present product. For example, in the dynamic shear resistance test, which is carried out as described in U. S. 2,450,219, column 5, lines 6 to 19, the NLGI No. 2 grade of grease of the foregoing table showed a miniature penetration before the test of 105 and after the test of 110. This further illustrates the excellent resistance of this grease to texture change when worked under high shearing stress. Another good property of the present grease, which makes it advantageous in use in windshield wipers employing Fabricord, is the fact that this grease causes little increase in stiffness of the Fabricord on contact therewith for substantial periods of time, and the said Fabricord does not crack on bending as experienced with other types of greases heretofore used for this purpose. The present grease is also satisfactorily resistant to rusting of metal in the salt spray test. It also exhibits practically no change in either worked or unworked penetration during storage or when packed in ball bearings over periods of time up to 12 months and more. Excellent results were obtained in a 15,000-mile automotive road test on the NLGI 0 grade of the foregoing table as a chassis lubricant, and on the NLGI No. 2 grade of the foregoing table as a wheel bearing lubricant. The latter was rated as the best wheel bearing grease out of a large number of greases compared in this practical service test.

EXAMPLE VIII

The following is an example of a preferred type of grease of the present invention containing a heavier base oil blend including a cylinder stock. The batch was prepared by the standard procedure, utilizing in the initial charge estolide-containing 12-hydroxy stearic acid and a light distillate paraffin base mineral lubricating oil having an SUS viscosity at 100° F. of 168 seconds; and the final grease was brought to NLGI No. 2 grade consistency with a blend of the said distillate oil and a deasphalted and solvent refined cylinder stock having an SUS viscosity at 210° F. of 160. The following Table II shows the composition and tests on this grease.

Table II

Calculated composition:

| | |
|---|---|
| Ca 12-hydroxy stearate | 11.5 |
| Excess Ca(OH)$_2$ | 0.2 |
| Distillate paraffin base mineral lubricating oil having SUS vis. at 100° F. of 168 sec | 30.7 |
| Deasphalted and solvent refined cylinder stock having SUS vis. at 210° F. of 160 sec | 57.1 |
| Diphenylamine | 0.5 |

Tests:

| | |
|---|---|
| Water, percent | 0.1 |
| Free Ca(OH)$_2$ | 0.24 |
| Dropping point, ° F | 295 |
| ASTM penetration at 77° F.— | |
|    Unworked | 242 |
|    Worked | 290 |
| AN–G–25 working stability—Penetration after 100,000 strokes | 275 |
| Dynamic shear test— | |
|    Miniature penetration before | 93 |
|    Miniature penetration after | 104 |
| Dynamic water resistance—Loss, percent | 0.5 |

Low temp. torque

| | Clockwise | Counter-clockwise |
|---|---|---|
| Sec./Revolution at 0° F | 5 | 6 |
| Sec./Revolution at −10° F | 18 | 15 |
| Sec./Revolution at −20° F | 57 | 50 |
| Sec./Revolution at −30° F | >120 | >120 |

Static heat test—1 hr. at 275° F.; no change.
Torque breakdown machine—Tested at 80° F. and 80–250° F.; no leakage in either roller or ball bearings and rating good in all tests.

The base oil blend in this grease exhibited the following tests:

| | |
|---|---|
| Gravity, ° API | 25.0 |
| Flash, C. O. C., ° F | 455 |
| Fire, C. O. C., ° F | 510 |
| SUS viscosity at 100° F | 1030 |
| SUS viscosity at 210° F | 80 |
| Viscosity index | 71 |
| Pour, ° F | +10 |
| Carbon residue, percent | 0.8 |

From the foregoing table it will be noted that the yield of this grease is good and the dropping point exceptionally high for a calcium base grease. The tests further show the product to possess excellent shear resistance, good low temperature properties, excellent resistance to water washing, satisfactory stability at temperatures substantially above those at which conventional calcium base greases can be employed, and good lubricating properties in ball and roller bearing service. Other tests not listed have shown this grease to be an excellent automotive wheel bearing lubricant, to have good pumping characteristics from pressure lubricators even at low atmospheric temperatures down to about 10° F. or below, and to satisfactorily resist rusting in the salt spray test (U. S. Government Specification 14–G–8). Practical service tests in passenger automobiles operated in normal service for 10,000 to 20,000 miles have shown excellent lubrication ratings in all cases. Due to the unusual properties of this grease, it is eminently suitable as a multi-purpose grease for service station use.

EXAMPLE IX

In addition to the straight calcium 12-hydroxy stearate grease described above, very satisfactory products can be obtained in accordance with the present invention by the use of a mixed base grease of 12-hydroxy stearic acid wherein a small amount of sodium soap is used with a major amount of the calcium soap. The standard procedure is employed in the manufacture of this mixed base grease, being modified by initially adding the dry lime to estolide-containing 12-hydroxy stearic acid and the other customary ingredients and saponifying for a period of time in excess of about 2 hours, and then adding caustic soda solution and saponifying for an additional period of time of about one hour.

The following is an example of the preparation of a satisfactory mixed base grease of this character. The initial charge to the unheated kettle was 14 lbs. of the distillate paraffin base mineral lubricating oil of SAE 10 grade having an SUS viscosity at 100° F. of 168, 10 lbs. of water, 14.1 lbs. of 12-hydroxy stearic acid containing 5.0 weight percent estolide and 890 grams of dry hydrated lime. These were mixed for 15 minutes at 76° F. The steam was then turned on and the kettle contents raised to about 190° F. and maintained for 3 hours to effect saponification of substantially all of the lime. Then 166 grams of caustic soda in aqueous solution was gradually added and saponification continued for one hour. The mass was then raised to 268° F. in 4.5 hours and maintained at 268 to 274° F. for 3 hours to effect dehydration. Oil addition was then carried out as the mass cooled to 118° F. over a period of 21 hours. The oil added during this period was a blend of the said distillate oil with the deasphalted and solvent refined cylinder stock employed in Example VIII.

The calculated composition of the finished grease was:

| | Percent by weight |
|---|---|
| Calcium 12-hydroxy stearate | 8.1 |
| Excess Ca(OH)$_2$ | 0.1 |
| Sodium 12-hydroxy stearate | 0.9 |
| Distillate mineral lubricating oil | 31.6 |
| Cylinder stock | 58.8 |
| Diphenylamine | 0.5 |

The grease was bright green, smooth and buttery, but somewhat stringy and free from graininess. Complete tests showed that it possessed the same desirable properties with respect to shear stability, water resistance, low temperature lubrication, heat resistance at 275° F., good Torque Breakdown Machine rating and excellent wheel bearing lubricant rating as the straight calcium 12-hydroxy stearate greases described above in Tables I and II.

Other batches of the mixed calcium-sodium 12-hydroxy stearate greases were prepared in the same manner but employing different ratios of calcium soap to sodium soap. Examples of these are shown in the following Table III:

Table III

| | | | |
|---|---|---|---|
| Ca:Na ratio | 9:1 | 4:1 | 2:1 |
| Soap, percent | 9.0 | 20.5 | 27.4 |
| Dropping point, ° F | 337 | 304 | 297 |
| ASTM penetration at 77° F.: | | | |
|   Unworked | 220 | 241 | 227 |
|   Worked | 279 | 311 | 400+ |

The grease in the left hand column of the foregoing table containing the 9:1 weight ratio of calcium to sodium soap is the grease described above. It will be noted that this grease possessed a dropping point of 337° F., and that an excellent yield was obtained in that a total soap content of 9 percent gave a grease of NLGI No. 2 grade.

Surprisingly, greases containing substantially higher ratios of sodium soap of the order of 4:1 and 2:1 calcium to sodium weight ratio, as listed in the middle and right hand columns of the table, did not possess these desirable properties. Thus, the 4:1 grease had a dropping point of only 304° F. and required a total soap content of 20.5 percent to produce a grease of unworked penetration within the NLGI No. 2 grade. Moreover, this grease appreciably softened on working. The 2:1 grease was even poorer with a dropping point of 297° F. and required a total soap content of 27.4 percent to provide an unworked penetration within the NLGI No. 2 grade which softened excessively on working. In order to obtain the advantages of the present invention, it is desirable to limit the sodium soap content to a maximum of about 6:1 calcium to sodium soap ratio. The sodium soap can vary from 0 up to the 6:1 maximum and still obtain the previously described desirable properties of the calcium 12-hydroxy stearate grease; but where a dropping point in excess of 300° F. is desired, then the minimum sodium soap content should be at least about 20:1 calcium to sodium ratio.

Mixed calcium:lithium 12-hydroxy stearate greases were also prepared in a similar manner. While a small proportion of the lithium soap in these mixed base greases also resulted in raising the dropping point of the predominantly calcium 12-hydroxy stearate grease above 300° F., the yields were generally poor in comparison with the straight calcium product, or the calcium-sodium product within the preferred range. Consequently, there appeared to be insufficient advantage in the blending of this more expensive lithium soap in the calcium 12-hydroxy stearate grease to justify its use; and it appeared desirable to go to a straight lithium soap grease prepared by other procedure to get dropping points of about 375° F. or higher for certain specialty uses. Mixed base soap greases prepared with other alkaline earth metals, such as a calcium:barium 12-hydroxy stearate grease, failed to show any increase in dropping point or other advantages over the straight calcium 12-hydroxy stearate grease. However, such mixed base greases containing a predominance of the calcium 12-hydroxy stearate are included in the present invention where the type and proportion of the other soap mixed with the major proportion of the calcium 12-hydroxy stearate does not seriously impair advantageous properties obtained with the straight calcium 12-hydroxy stearate grease.

While calcium base greases of this type are generally prepared with mineral lubricating oils, it is to be understood that other types of liquid oleaginous lubricating bases can be employed either in whole or in admixture with mineral lubricating oil. For example, any of the so-called synthetic lubricants, such as aliphatic dicarboxylic acid esters of the character of 2-ethyl hexyl sebacate, can be used. Where a blend of the synthetic lubricant with mineral lubricating oil is employed, it is desirable to utilize in the initial charge to the kettle a lighter distillate mineral lubricating oil of the character specified above, and then blend in the synthetic lubricant following the dehydration step.

While diphenylamine represents a very satisfactory oxidation inhibitor for greases of this type, it is to be understood that other conventional types of oxidation inhibitors can be employed, such as other amines, dialkylated phenols, and the like. Moreover, it is to be understood that the grease of the present invention may contain other additives of conventional type, such as extreme pressure agents, corrosion inhibitors, pour depressants, dyes and the like.

The presence of estolide in hydroxy acids other than 12-hydroxy stearic acid is also essential to the production of lump-free, grain-free stable anhydrous alkaline earth metal greases from such monohydroxy and dihydroxy fatty acids. Such hydroxy fatty acids usually contain about 12 to 24 carbon atoms, and are exemplified by 9- and 10-hydroxy stearic acids, 9,10-dihydroxy stearic acid and 8-hydroxy palmitic acid. The estolides of monohydroxy fatty acids containing 12 to 24 carbon atoms are represented by the general formula:

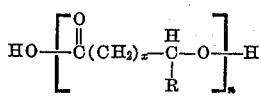

wherein R is an aliphatic hydrocarbon radical containing 1 to 21 carbon atoms, $x$ is an integer having the value of 1 to 21, and $n$ is an integer usually having a value of 2 to 5. In calcium greases of monohydroxy or dihydroxy-substituted fatty acids, other than 12-hydroxy stearic acid, the presence of 3 to 15 weight percent estolide in the hydroxy acid assures production of lump-free, grain-free greases as long as the cold premix-dehydration below 275° F. technique is employed. It is understood, of course, that the presence of the prescribed amount of estolide in the hydroxy fatty acid is critical in the production of other alkaline earth metal hydroxy acid greases, for example, barium 12-hydroxy stearate grease, strontium 12-hydroxy stearate grease, barium 9-hydroxy stearate grease and strontium 10-hydroxy stearate grease.

Obviously, many modifications and variations of the invention as above set forth may be made without departing from the spirit and scope thereof, and only such limitations should be imposed as are indicated in the appended claims.

We claim:

1. A process of manufacturing smooth, buttery, lump-free, grain-free anhydrous calcium hydroxy fatty acid greases which comprises mixing at room temperature below 100° F. a minor portion of the liquid oleaginous lubricating base employed in the grease composition, a small amount of water, hydroxy fatty acid containing 12 to 24 carbon atoms and a minor portion of an estolide, said minor portion constituting at least 3 weight percent of said hydroxy fatty acid and calcium hydroxide, said mixing being continued for a period of time such that a thick emulsified mixture is formed before heating said mixture, saponifying said mixture, dehydrating the saponified mass with stirring at a temperature below about 285° F., and adding the remainder of said liquid oleaginous lubricating base during stirred cooling of the grease mixture.

2. The process according to claim 1 in which the dehydration is effected at a temperature below about 275° F.

3. A process according to claim 1 in which the estolide content of the hydroxy fatty acid is between 3 and 15 weight percent.

4. A process for the manufacture of a lump-free, grain-free anhydrous calcium 12-hydroxy stearate grease of smooth buttery texture which comprises mixing at room temperature below 100° F. a small amount of water, 12-hydroxy stearic acid containing between 3 and 15 weight percent estolide liquid oleaginous lubricating base in an amount approximately equivalent to the weight of said 12-hydroxy stearic acid and hydrated lime, said mixing being continued for a short period of time such that a thick emulsified mixture of said ingredients is formed prior to heating, saponifying said mixture, dehydrating the saponified mixture with stirring at a temperature below about 285° F. and adding additional liquid oleaginous lubricating base during stirred cooling of the dehydrated mixture.

5. A process according to claim 4 in which the dehydration is effected at a temperature between 250 and 275° F.

6. A process according to claim 4 in which the 12-hydroxy stearic acid contains 4 to 10 weight percent estolide.

7. A process according to claim 4 in which the mixing below 100° F. is continued for at least 10 minutes prior to saponification by the application of heat.

8. A process according to claim 4 wherein the liquid oleaginous lubricating base is a mineral lubricating oil having an SUS viscosity at 100° F. less than 350 seconds.

9. A process according to claim 4 wherein about 0.5 to 3.0 percent by weight based on the finished grease of a heavy residual mineral lubricating oil is added following the dehydration step.

10. A process for manufacturing a mixed calcium-sodium 12-hydroxy stearate grease of smooth buttery texture and free from graininess and having a dropping point above 300° F. which comprises mixing at room temperature below 100° F. a small amount of water, 12-hydroxy stearic acid containing 3 to 15 weight percent estolide, a liquid oleaginous lubricating base in an amount approximately equivalent in weight to said 12-hydroxy stearic acid and a quantity of lime insufficient to saponify all of the 12-hydroxy stearic acid, said mixing being continued for a period of time such that a thick emulsified mixture is formed prior to heating, raising the temperature of the mixture to about 150 to 210° F. with stirring and maintaining the mixture at said temperature for a period of time to saponify all but a small portion of the lime with the estolide-containing 12-hydroxy stearic acid, then adding caustic soda to the mixture in a proportion to provide a weight ratio of calcium 12-hydroxy stearate to sodium 12-hydroxy stearate soap in the grease within the range of 6:1 to 20:1, completing said saponification at said 150 to 210° F. temperature range, dehydrating the resulting saponified mixture with stirring at a temperature between about 250 and 275° F., adding additional liquid oleaginous lubricating base to the dehydrated mass as it is cooled with stirring and drawing the mass to obtain grain-free, buttery grease.

11. An anhydrous grain-free calcium hydroxy fatty acid grease of smooth buttery texture comprising an oleaginous liquid lubricating base as the major component and containing 5 to 20 percent by weight of calcium salt of a hydroxy fatty acid based on the weight of the grease, said hydroxy fatty acid containing containing 12 to 24 carbon atoms and a minor portion of an estolide of said fatty acid, said minor portion constituting at least 3 weight percent of fatty acid.

12. A calcium grease according to claim 11 in which the hydroxy fatty acid contains 3 to 15 weight percent estolide.

13. A calcium grease according to claim 11 in which the estolide mainly comprises dimers, trimers, tetramers and pentamers.

14. An anhydrous lump-free, grain-free calcium 12-hydroxy stearate grease of smooth buttery texture comprising a liquid oleaginous lubricating base as the major component and containing 5 to 20 percent by weight of a calcium salt of 12-hydroxy stearic acid based on the weight of the grease, said 12-hydroxy stearic acid containing between 3 and 15 weight percent estolide.

15. A calcium 12-hydroxy stearate grease as described in claim 14 in which the estolide has an average molecular weight in the neighborhood of 800 to 1,200.

16. An anhydrous lump-free, grain-free calcium 12-hydroxy stearate grease of smooth buttery texture comprising a liquid oleaginous lubricating base as a major component and 5 to 20 weight percent based on the total composition of a calcium salt of a 12-hydroxy stearic acid containing 3 to 15 weight percent of an estolide having an average molecular weight between 800 and 1,200.

17. A calcium 12-hydroxy stearate grease as described in claim 16 in which the liquid oleaginous lubricating base is a mineral base lubricating oil having a viscosity between 150 and 1,030 SUS at 100° F.

18. A lubricating grease composition consisting essentially of mineral base lubricating oil having a viscosity between 150 and 1030 SUS at 100° F. and thickened to lump-free grease consistency with about 6 to 20% by weight, based on the total composition, of substantially anhydrous calcium soap of 12-hydroxy stearic acid, said grease being cooked to a maximum temperature not above 275° F. during soap formation.

19. The process of preparing a substantially anhydrous lump-free lubricating grease which comprises saponifying about 6 to 20% by weight, based on the total composition, of 12-hydroxy stearic acid, with lime at a maximum cooking temperature of 275° F. in the presence of a relatively small proportion of mineral lubricating oil roughly equivalent to the amount of acid, cooking slowly to gradually dehydrate and form a soap concentrate, and then adding further mineral oil and stirring while cooling to about 190° F.

20. Process according to claim 19 wherein the proportions of acid are between 6 and 12% by weight.

21. The process of preparing a stable substantially anhydrous calcium base lubricating grease, which comprises saponifying at a temperature of 150–210° F., 12-hydroxy stearic acid with lime in the presence of a small amount of distillate mineral lubricating oil equivalent to only a minor proportion of the liquid oleaginous lubricating base employed in the final grease, carefully heating the saponified mass with stirring to a controlled temperature below about 285° F. to dehydrate the saponified mass and reduce the water content at least to 0.1 percent by weight based on the finished grease, then adding additional oleaginous liquid lubricating base and stirring while cooling to bring the calcium 12-hydroxy stearate soap content within the range of 6–20 percent by weight based on the final grease and to lower the temperature of the grease below 210° F., and finally drawing the product at a temperature below 210° F., to obtain a smooth glossy substantially anhydrous calcium 12-hydroxy stearate grease which is free from lumpiness, stable against oil and soap separation at temperatures up to 275° F., and has a dropping point above 275° F.

22. A stable substantially anhydrous calcium 12-hydroxy stearate grease consisting essentially of an oleaginous liquid lubricating base thickened to a grease consistency with 6–20 percent by weight of the saponification product of 12-hydroxy stearic acid with lime in the presence of a small amount of distillate mineral lubricating oil which is equivalent to only a minor proportion of said oleaginous liquid lubricating base, said grease being dehydrated at a temperature below about 285° F. to a water content containing not more than 0.1 percent by weight and being smooth, glossy, and free from lumpiness, having an ASTM unworked penetration below 400 and above 150, a dropping point above 275° F., capable of providing good lubrication of anti-friction bearings at temperatures up to 250° F. without substantial leakage, and stable against oil and soap separation at temperatures up to 275° F.

References Cited in the file of this patent

UNITED STATES PATENTS

| | | |
|---|---|---|
| 2,503,749 | Langer et al. | Apr. 11, 1950 |
| 2,607,734 | Sproule et al. | Aug. 19, 1952 |
| 2,607,735 | Sproule et al. | Aug. 19, 1952 |
| 2,618,599 | King et al. | Nov. 18, 1952 |
| 2,628,938 | Whitney | Feb. 17, 1953 |
| 2,695,878 | Entwistle | Nov. 30, 1954 |